United States Patent [19]

Baldwin

[11] 4,280,147

[45] Jul. 21, 1981

[54] DIGITAL TELEVISION SYSTEM AND METHOD

[75] Inventor: John L. E. Baldwin, Eastleigh, England

[73] Assignee: Independent Broadcasting Authority, London, England

[21] Appl. No.: 9,185

[22] Filed: Feb. 2, 1979

[30] Foreign Application Priority Data

Feb. 2, 1978 [GB] United Kingdom .............. 04326/78

[51] Int. Cl.³ ............................................. H04N 5/79
[52] U.S. Cl. ..................................... 360/10; 358/127; 360/33
[58] Field of Search .................. 360/9, 10, 14, 32, 33, 360/38, 40; 358/4, 127, 8

[56] References Cited

U.S. PATENT DOCUMENTS

| | | | |
|---|---|---|---|
| 3,541,244 | 11/1970 | Law | 360/9 |
| 3,571,502 | 3/1971 | Law | 360/9 |
| 4,016,361 | 4/1977 | Pandey | 360/9 X |
| 4,159,480 | 6/1979 | Tachi | 358/4 X |

Primary Examiner—Bernard Konick
Assistant Examiner—Donald McElheny, Jr.
Attorney, Agent, or Firm—Laubscher & Laubscher

[57] ABSTRACT

A method and apparatus are disclosed for assembling digital data representing a T. V. picture, including the steps of producing digital words representing a line of video, producing a digital code indicative of each line of video, producing a digital code indicative of the field containing the line, combining the digital codes and the digital words for each line of video, storing the digital words line-by-line until a number of lines at least equal in number to the number of lines in a field has been stored, and reading out the digital words. One advantage afforded by the invention is that for fast winding during editing, the stored field of video can be made up of lines derived from a number of different fields, thereby not only reducing the amount of storage required, but also speeding up the process.

16 Claims, 11 Drawing Figures

DIGITAL TELEVISION SYSTEM AND METHOD

BACKGROUND OF THE INVENTION

The present invention relates to a method of and apparatus for displaying digitally encoded video signals, and preferably for replaying such signals which have been recorded on a recording medium and at a speed different to that at which the signals have been recorded.

Although the bulk of the description is given in relation to the replaying of recorded information, the method and apparatus are equally useful for accepting transmitted digitally encoded video signals, say for instant replay in slow motion or for accepting one transmitted broadcast and synchronising that broadcast with another transmitter broadcast.

The most common existing recording medium is magnetic tape and at present there are two types of so called "helical scan" recording and playback apparatus for magnetic tape. The first type utilizes a revolving drum of relatively large diameter which in making one revolution records or plays back one complete field of a television picture from magnetic tape entrained on the surface of the drum. The information being recorded as an angled stripe on the tape. The second tape utilizes a drum of smaller diameter which revolves at a higher speed than the first type. In this case, one complete field is recorded on the tape in a number of segments, say 6, and for each revolution of the drum, one of the segments is played back. The first type will hereinafter be called a non-segmental apparatus and the second type, a segmental apparatus.

For non-segmented recorders there is an inevitable gap in information lasting several lines which is normally arranged to occur during field blanking.

Such a gap would also occur on segmented recorders, between segments, if only one head is used. To overcome this problem two heads are used, diametrically opposite one another, and the tape is wrapped about 190° around the drum causing an overlap during which time switching from one head to the other occurs.

When editing video tape it is often only necessary to have a fairly good visual representation of the picture recorded on the tape and it is important that the tape can be run through faster than usual in order to save time. When using non-segmental type apparatus it is possible to run the tape through at a fairly rapid rate, say 5 or 6 times the normal rate and still produce a picture which is acceptable for editing purposes.

Further, if slow motion is required this cannot be achieved with a satisfactory picture quality without utilizing expensive ancilliary equipment.

SUMMARY OF THE INVENTION

We have devised a method of and apparatus for replaying video signals which allows more satisfactory slow motion pictures to be obtained and which allows editing of video tape regardless of whether the playback apparatus is of the segmental or non-segmental type. For the purposes of this specification slow motion is where the picture is shown at a speed 3 times or more slower than normal.

The present invention provides a method of assembling digital data representing a T.V. picture comprising, producing digital words representing a line of video; producing a digital code indicative of each line of video; producing a digital code indicative of the field containing the line being sampled; combining said digital codes and said digital words; storing said digital words until a number of lines at least equal in number to the number of lines in a field has been stored; and reading out said digital words.

The present invention also provides a digital T.V. system comprising a line of video; first coding means for producing digital words representing the line of video; second coding means for producing a digital code indicative of each line of video; third coding means for producing a digital code indicative of the field containing the line being sampled; combining means for combining said digital codes and said digital words; memory means for storing said digital words representing a number of lines at least equal in number to a field of video; and read out means for reading out said digital words.

In one embodiment, the digital words are recorded on a magnetic tape before being stored and read out. This allows the picture made up of the digital words to be shown at a speed different to that at which it was recorded.

One advantage of the above method and apparatus is that for some purposes, e.g. fast winding during editing, the stored field of video can be made up of lines derived from a number of different fields which reduces the amount of storage required, and speeds up the process.

BRIEF DESCRIPTION OF THE DRAWING

Features and advantages of the present invention will become apparent from the following description of an embodiment thereof given by way of example when taken in conjunction with the accompanying drawings, in which:

FIG. 8, including 8A and 8B, shows a more complex interpolation scheme yielding more acceptable results;

DETAILED DESCRIPTION

The embodiment to be described is based on the fact that a field or a colour television picture is made up of a plurality of lines each of which can be subjected to an analogue to digital conversion and then recorded as a digital signal. Further, it is possible to identify individual lines of each field and to produce a digital signal indicative of and exclusive to an individual line.

In the embodiment, lines of each field of the picture are stored in the appropriate part of a memory together with information regarding the lines stored and these lines are then read out in a sequence which has been determined will produce a reasonable picture given the manner in which the information has been stored.

The method and apparatus to be described is applicable to both PAL, NTSC and SECAM derived video signals. However, the bulk of the description is given in relation to PAL signals. The main difference between the method and apparatus for the types of signals is that for NTSC signals fewer lines have to be recorded. This comes about due to the fact that a PAL signal will repeat itself every eight fields whereas a NTSC signal will repeat itself every four fields.

If every line of a PAL signal were recorded until the pattern repeated itself, it would be necessary to record 2500 lines which would require a twelve bit word giving 4096 combinations. It is preferable to use three bits to identify the eight fields and nine bits to identify lines in a field (either 312 or 313). For some applications a sequence of 312,312,312,316 may be better. Normally positive identification of position in sequence can only be made at about field sync time by comparison of field syncs, line syncs and phase alteration. There remains an ambiguity between fields 1 and 5 of a PAL signal as they differ only in sub-carrier phase and since this is not defined at present the ambiguity cannot be resolved. However, the difference is real and for some applications arbitrary decisions have to be made and complied with for a production sequence e.g. animation on tape.

For some applications numbering every line is unnecessary and a reduction of the number of bits for identification may be effected. If, for example, once in four lins is sufficient then only three bits need to be sent per line, giving 12 in 10 lines. Under these conditions only 10 bits total are necessary for the information but the possibility of confusing one set of three bits with another has to be resolved. One method is to precede the field numbering bits by say a one and each block of three line numbering bits by a zero; this would normally use four bits per line. Another method which takes longer to resolve unambiguously is to subtract from the last 12 bits received the previous twelve bits. If note is only taken of the last twelve bits when the difference is one, the ambiguity may be resolved. By this means positive identification of a line may be achieved with a maximum eight lines starting from scratch.

Figure 1:
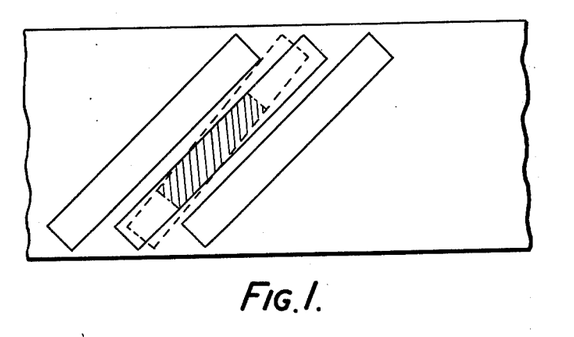
FIG. 1 shows a diagrammatic representation of segments of a picture recorded on magnetic tape.

The difficulties involved using helical scan apparatus will be more apparent from the following discussion of FIG. 1 which shows, in diagrammatic form a portion of magnetic tape with three recording tracks thereon. If the tape has been recorded using non-segmental apparatus, each track will contain one complete field of a television picture but if it has been recorded using segmental apparatus, each track will only contain part of a field. The angle of the tracks is determined by the rotational speed of the drum and the speed of the tape. Thus, if either or both of the drum or tape speeds is altered, the angle of the path which the scanning heads will make as they travel over the tape will alter, becoming more upright as the relative tape/head speed increases and more nearly horizontal with decreasing tape/head speed. The result of that only a portion of each track will be properly played back if the playback apparatus operates at a different speed to the recording apparatus as indicated by cross-hatching in FIG. 1.

Figure 10:
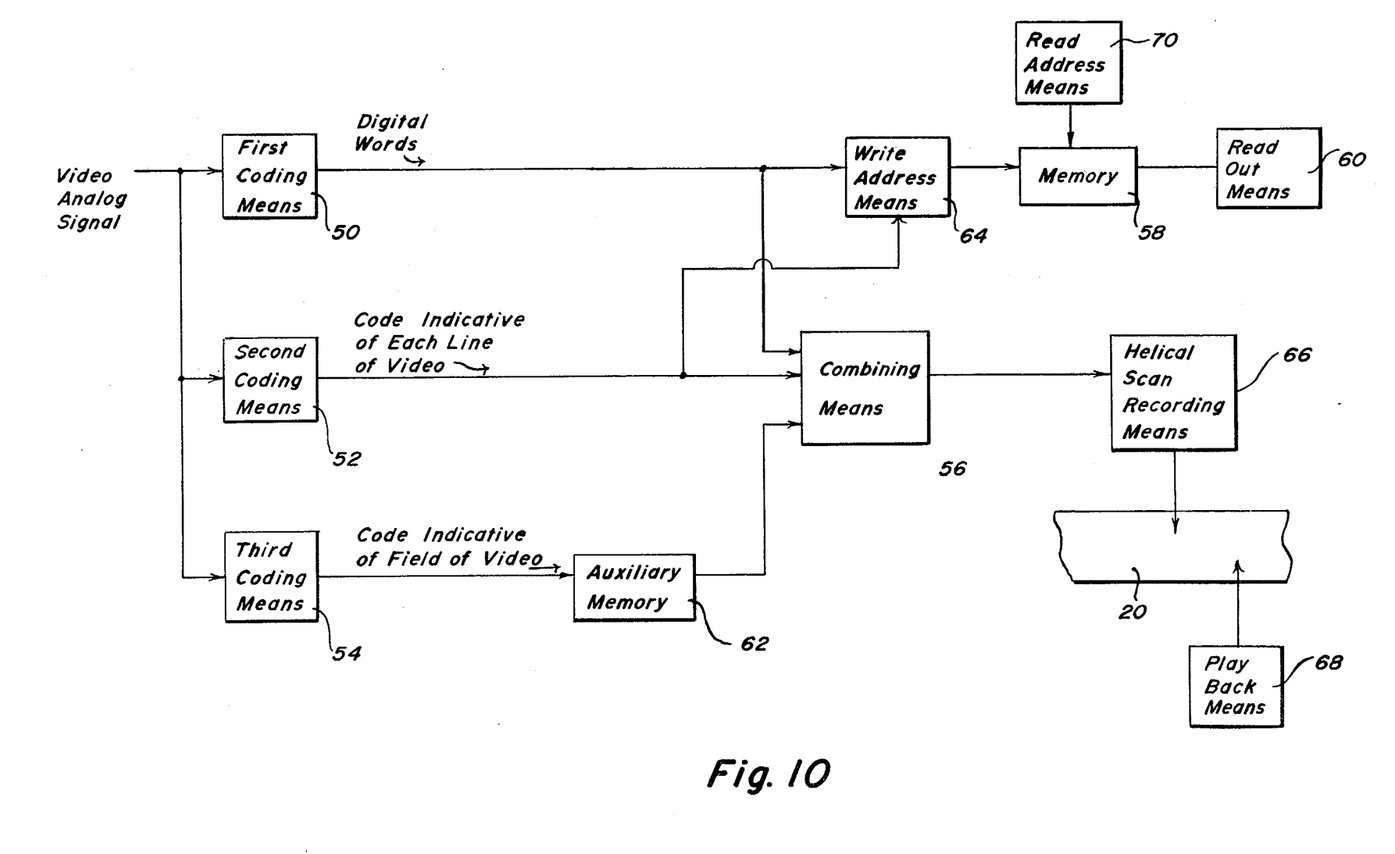
FIG. 10 is a block diagram of the system of the present invention for processing a T.V. signal.

The preferred method is to record on the tape digital signals, preferably of twelve bits, indicating the field and individual line. On playback, these signals, together with the digital signals representing the actual video are stored and then retrieved from the store at the proper time in order to compose a meaningful representation of the original picture. As shown in the system of FIG. 10, first coding means 50 produce from the analog video signal digital words representing a line of video, and second coding means 52 produce a digital code indicative of each line of video. Third coding means 54 produce a digital code indicative of the field containing the lines of video being encoded by the second coding means. Combining means 56 combine the digital words for each line of video. Memory means 58 store the digital words representing a number of lines at least equal in number to a field of video, and read out means 60 read out the digital words. A separate auxiliary memory 62 is provided for storing digital codes representing the fields of video, and write address means 64 responsive to the digital codes representing the lines of video serve to write the digital words into the first memory. Helical scan recording means 66 record the combined digital words and digital codes on magnetic tape 20, and play back means 68 replay the recorded words and codes at a speed different to the speed of recording. The write address means 64 write the digital words into the memory means in a first order, and read address generator means 70 read the digital words out of the memory in a second order different to the first. Details of the sampling of the analogue signals and the production of a digital word for each sampled analogue value is now well known in the art and it is not considered necessary to describe the method or the apparatus for doing this.

Figure 2:
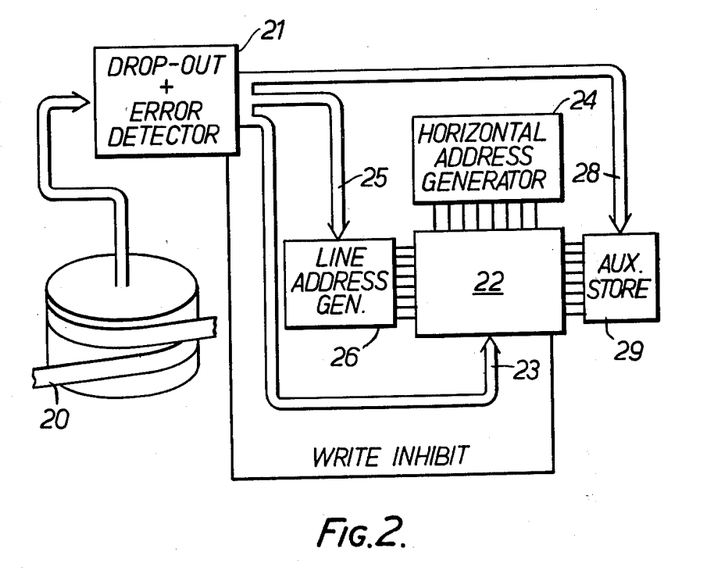
FIG. 2 shows a block diagram of one part of apparatus for replaying the information on the tape shown in FIG. 1.

Turning now to FIG. 2, this shows part of the playback apparatus. On playback, digital signals are picked up from a tape 20 and are checked for errors and drop outs using a detector 21. The digital signals also go through series to parallel conversion means (not shown). When a complete line has been correctly received, together with its field and line identification codes, the digital video information signals are stored in a main store 22, via a data highway and terminals 23, in this representation, into the plane of the paper using a horizontal address generator 24. Simultaneously, the line identification code is fed via a further data highway and terminals 25 to a line address generator 26 which provides the memory line address for the video signals. Also the field identification code is fed via yet another data highway and terminals 28 to an auxiliary store 29 connected to the main store 22 such that the field identification code for the video signals on terminals 23 can also be determined. Should a drop-out occur or there be any other error in the information, writing into the main store 20 is inhibited by a "write inhibit" signal generated by the detector 21.

It is apparent that the recording tracks containing the digital signals can be disposed in any convenient relationship e.g. angled using a helical scan type apparatus or parallel to the edges of the tape using apparatus such as disclosed in our copending application Ser. No. 888,863, now U.S. Pat. No. 4,199,793 of Apr. 22, 1980. This comes about due to the fact that only those portions of the tracks which contain complete lines are stored; all others are rejected.

Figure 3:
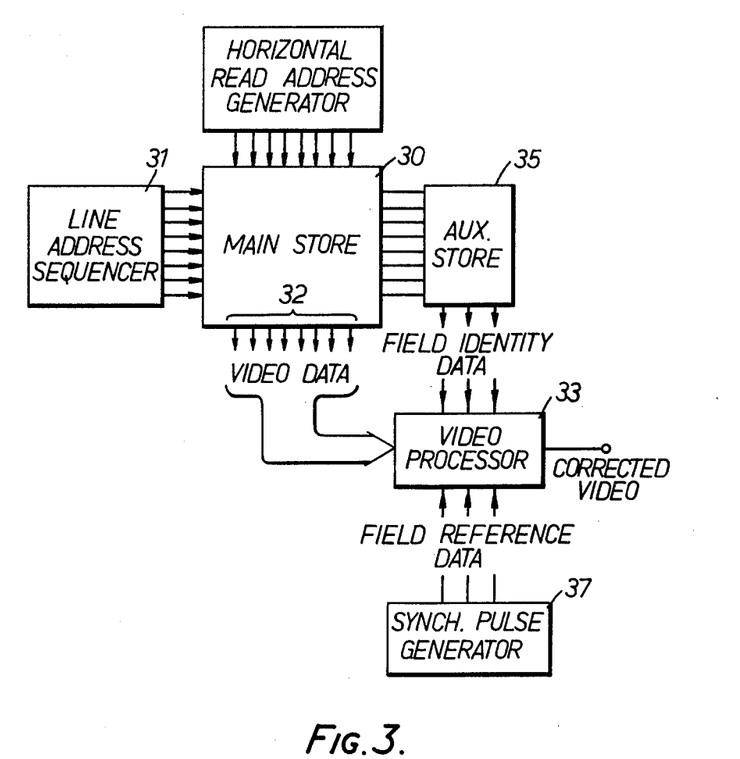
FIG. 3 shows a block diagram of another part of the apparatus for replaying the information on the tape shown in FIG. 1.

FIG. 3 shows how the digital signals in the main and auxiliary stores are read out and processed to provide a field of video. It will be appreciated that the main store 22 will have associated with it "write" apparatus as shown in FIG. 2 and "read" apparatus as shown in FIG. 3. However, it is preferred to have two main stores and two auxiliary stores which are used alternately so that as one set of a main and auxiliary store is being "written" into the other set is being "read." Thus, in FIG. 3 only as much of the apparatus is shown as is required for an understanding of the "read" operation.

In FIG. 3 another main store 30 is addressed via a read-out means in the form of a line address sequencer 31. The sequencer can operate in one of two ways depending on how the information is written into the memory. One way is for the information to be written into the memory such that the sequencer 31 need only sequentially address the memory and read out such line stored one after another. Alternatively, the information may be written into the store sequentially as it is received. In that case, the line address sequencer has to scan the line addresses of the information and extract the line information in the correct order for composing the picture. This will be explained in more detail later. The information contained in the store 30 is thus read out via terminals 32 and fed to a video processor 33. Simultaneously, the auxiliary store 35 is addressed to provide the information regarding the field from which that line of video being read out via terminals 32 was obtained. The field information is also fed to the video processor 33. There it is compared with field reference data fed to the processor 33 via terminals 36 and indicative of the field being displayed by the playback apparatus. The processor 33 makes the necessary corrections if any, to the signals fed to it from the stores 30, 35 in order that the line information from the main store 30 looks like information of the desired field and then feeds the processed data to further apparatus (not shown) for transmitting or displaying the picture.

The field reference data is generated from local synch pulse data derived from the output of a synch pulse generator 37.

Turning now to the detailed operation of the apparatus; there are two distinct modes, namely slow motion and fast winding for editing purposes. Slow motion will be discussed first.

Information has been stored on the tape in the form of angled tracks and it is assumed, for simplicity that a complete field is recorded on one angled track hence the apparatus has two heads. For slow motion display, the relative tape/head speed is reduced thus on replay the scan of the heads on the tape is more nearly horizontal than are the actual tracks on the tape hence one of the two heads only reproduces a portion of the track for, say, field 1 e.g. lines 1 to 50 of field one. It is thus apparent that the various fields will be reproduced bit by bit but eventually each field will be completely reproduced.

The line information is processed as described above in relation to FIG. 2 and stored in the main store 22 or 30 depending on which is being used at that time for writing. The line address generator preferably allocates the information received the same address as that information will be used to make up the picture e.g. lines 1 to 50 will be allocated addresses 1 to 50 and lines 201 to 250 will be allocated addresses 201 to 250 with the stores being filled gradually but not sequentially. This allows the information to be read out sequentially. As described above, in relation to FIG. 3, it is possible to write the information in sequentially and read it out in a non-sequential manner but a manner such that lines 1 to 312 appear at the video processes sequentially.

The signals to be viewed needs to have the correct sequence of fields. Under normal operations this is achieved by appropriately phasing the video tape recorder. During fast winding or during slow motion this is not possible. For slow motion it is not permissible to show fields 1 and 2 alternately a number of times before going on to fields 3 and 4, again shown alternately, since this would result in an oscillation of the moving parts of the picture; the required process is to alternate between a signal like field 1 and a signal produced from field 1, but with the interlace changed; after a number of repetitions one then passes on to information recovered from field 2.

Figure 4:
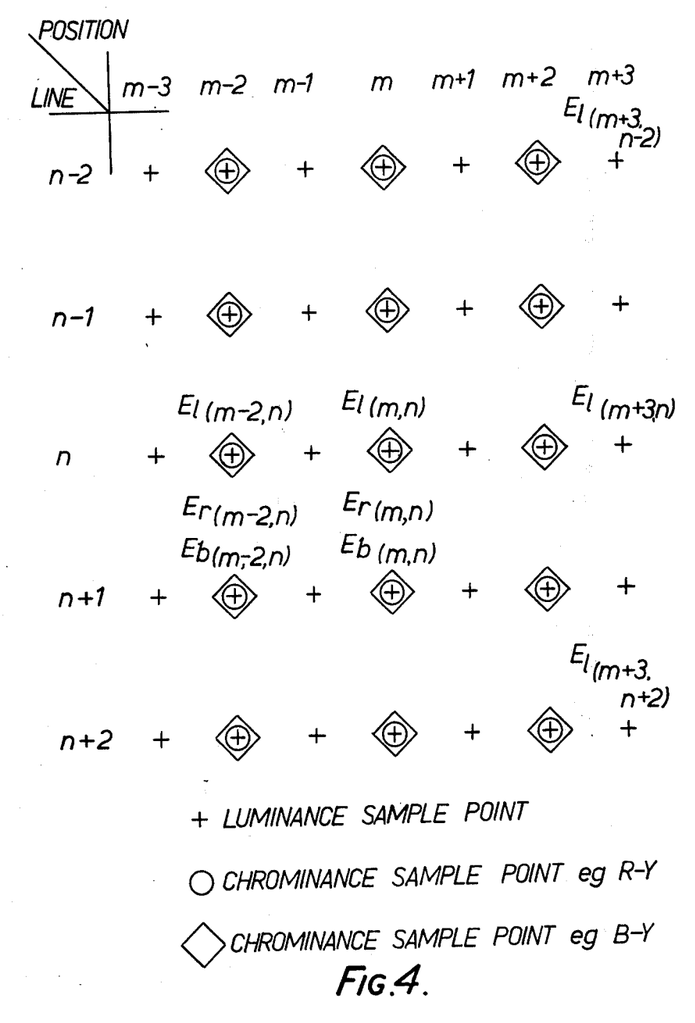
FIG. 4 shows a diagrammatic representation of the spatial position of sample points occurring on a small part of a television picture.
Figure 5:
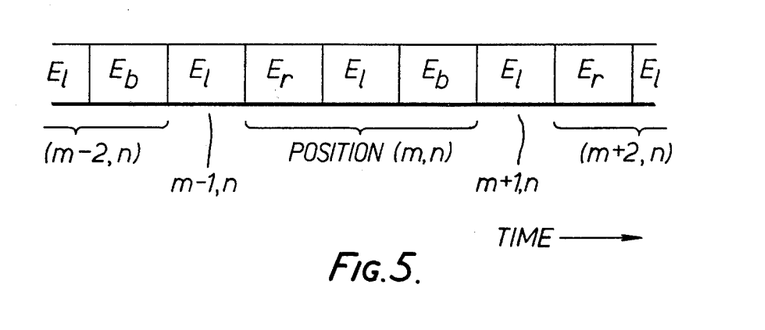
FIG. 5 shows the signal format.

The video processor 33 is used to ensure that, where necessary, the information to be transmitted or displayed is in the correct form. How this is achieved will now be described with reference to FIGS. 4 to 9. The description of FIGS. 4 and 5 is equally applicable to both fast winding or slow motion.

For FIGS. 4 to 9 and the description which follows, the signal recorded on the tape and representing the video signal is assumed to be either;

(a) a component coding scheme in which the chrominance and luminance information is carried by separate words recorded on tape; or (b) a composite signal e.g. PAL, is recorded on tape and on replay this is decoded to give component signals with separate words carrying the chrominance and luminance information.

It is also assumed that the sample positions are lined up vertically, or near vertically below one another when one considers a T.V. picture.

These assumptions may result in a signal in which the sample positions repeat every two fields for a PAL signal and this is assumed. In FIG. 4 showing the spatial position of the sample points for a number of lines constituting a picture, the luminance sample points are shown by a cross, the sample of one of the chrominance signals e.g. R-Y is shown by circles and the position of the other chrominance signal sampling points e.g. B-Y is shown by diamonds. For the particular system chosen two chrominance words are produced at alternate sites of luminance words. Obviously other arrangements could be realized in which the chrominance sample sites occur less frequently e.g. every fourth luminance site.

The production of separate chrominance and luminous information can be achieved using any suitable apparatus e.g. spacial filters. It is thought that such apparatus is now well known in the art but further information regarding such apparatus can be obtained from I.B.A. Technical Review Vol. 8 September 1976.

The lines are numbered as they would occur in a picture and not as they occur in time; lines n−2, n and n+2 occur on one field and n−1, n+1 etc., on the other field.

FIG. 5 shows the signal format recovered from tape, after appropriate decoding if composite coding is used, in which $E_b$ represents a B-Y chrominance digital word, $E_l$ represents a luminance digital word and $E_r$ represents an R-Y digital chrominance word. It is convenient to arrange that chrominance words together with the co-sited luminance words are adjacent as shown in the figure. These are separated from the next co-sited group by the intervening luminance word.

By adopting precisely the same format for each line of information it will become apparent from the interpolation which may follow will always interpolate between vertically displaced like word and will result in a signal of the same format.

As mentioned above for slow motion, it is necessary to repeat field 1 a number of times and then slow and repeat field 2 a number of times, etc. It is apparent, however, that field 1 consists of only 312 lines which is only one half of a picture. It is necessary therefore for the processor 33 to use the information from field 1 to provide the matching interlace for field 1.

Figure 6:
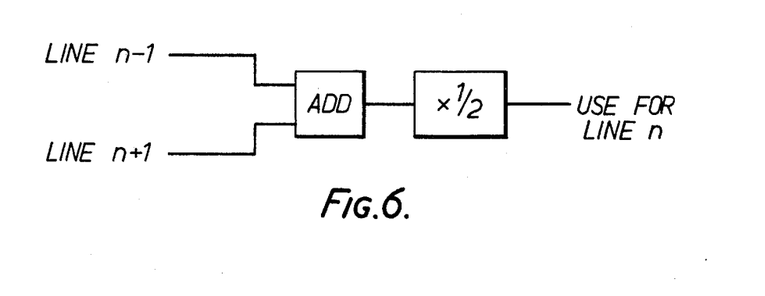
FIG. 6 shows a simple interpolation scheme for turning information recovered on one field to that suitable for use on another field.

A method of changing the interlace is shown in FIG. 6. Assume that field 2 is to be displayed and that field 2 information stored will constitute lines n−1 and n+1 of the eventual picture. It is necessary for the interlacing field to produce lines n, n+2 etc of the eventual picture and this is done using interpolation techniques on the information. In this figure information from lines n−1 and n+1 pass in step to an adder and after addition the signal is multiplied by half and may be used as a substitute for the information on line n.

Figure 7:
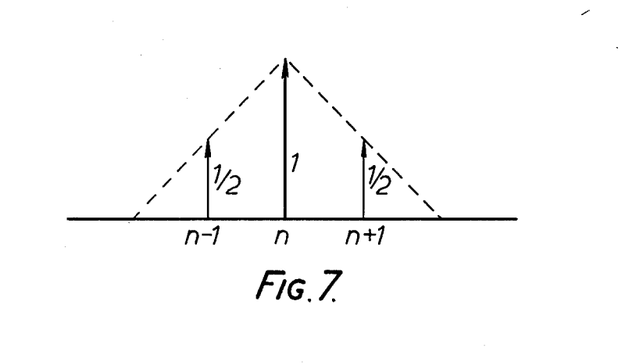
FIG. 7 shows the interpolation function used in this simple scheme.

During slow motion on some fields the information is used directly and this leaves the vertical resolution unimpaired; on the interleaving fields interpolation will normally be used. The interpolation function shown in FIG. 7 represents these two cases. When an average of the two lines n−1 and n+1 is used the vertical resolution is impaired and this variation of resolution can be disturbing.

Figure 8A:
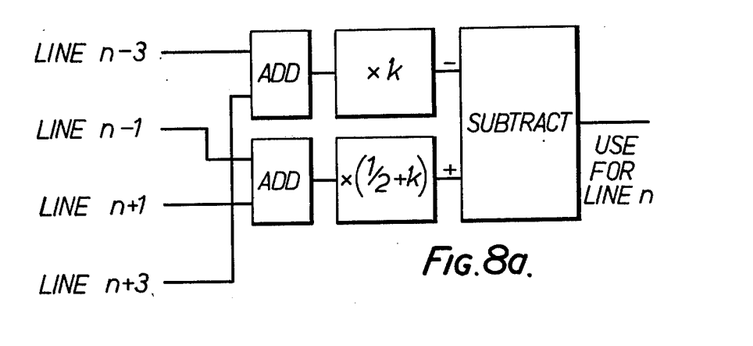
Figure 8B:
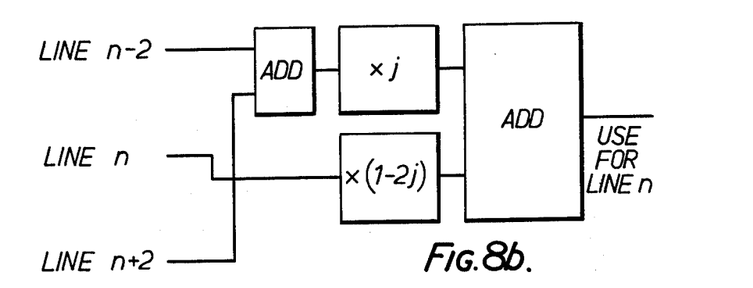

The variation of resolution may be decreased by using the arrangement shown in FIG. 8(a) where n−1, n+1, etc. relate to the field in question and not the picture line numbering as before. With this scheme, by an appropriate choice of coefficient k, it is possible to arrange that the variation is reduced to zero at one particular vertical resolution frequency. Unfortunately this variation is only zero at the one frequency and it is often found that the variation of resolution at other frequencies can be disturbing on certain pictures. A better compromise can be obtained by impairing the vertical resolution at all times when slow motion is in use and this may be achieved by "interpolating" the lines n−2, n and n+2 of the field in question as shown in FIG. 8 (b) and using this in place of line n when interpolation is not theoretically required, using the FIG. 8(a) scheme when it is required. An appropriate choice of coefficients j and k can be used to give acceptable results.

Figure 9:
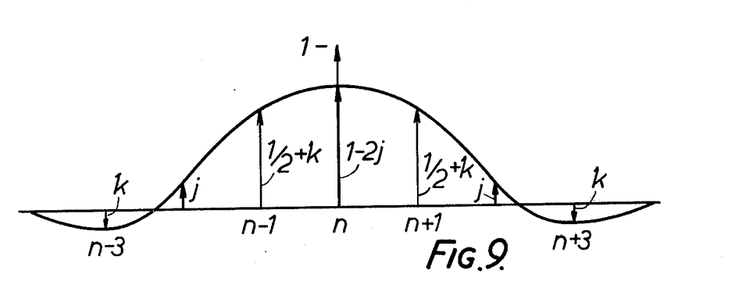
FIG. 9 shows the interpolation function for this more complex interpolation scheme.

FIG. 9 shows the interpolation function that results and this can be considered to be the equivalent of the time domain response to a unit impulse.

The above description has been given in relation to a non-segmental apparatus but a segmental apparatus would operate in a similar manner. The main difference is that the blocks of lines fed to the memory would contain a smaller number of lines but eventually each field would be stored in the memory.

Turning now to fast winding for editing purposes, the requirements here are quite different to those prevailing for slow motion. Whereas the slow motion mode is arranged to produce a picture of a quality good enough for transmission, the fast winding mode is only for working purposes and hence it is often not even necessary to have colour. Thus it has been found that the video processor can be largely dispensed with in these circumstances.

As with slow motion, the change in relative tape/head speed means that only portions of the tracks will be replayed. For a non-segmental apparatus the speed of fast winding is not important but for a segmental apparatus it may be necessary to wind at a specific rate to optimise picture quality. The following description will be given in relation to segmental apparatus. For European standards T.V. 6 sweeps/field are used and for U.S. standard T.V. 5 sweeps/field are used. The following description will be given in relation of a 6 sweep/field apparatus it being readily apparent how 5 sweep/field apparatus would differ.

Assuming relative tape/head speed of twice normal and the first head starts to sweep the beginning of the track recorded by the first head, then recording head sweep 2,4,6 of field one are missing which will cause parts of the eventual picture to be missing. This, of itself, may not be disasterous as far as the operator is concerned since the missing part or parts of the picture may be unimportant as far as he is concerned. However, we have found that winding at seven times normal rate will produce an acceptable picture for editing purposes. The picture itself is composed of a number of horizontal bands with noisy edges but a complete picture is present. The noise comes about adjacent bands which come from different fields. In more detail again assume that the first head is arranged to start sweeping the middle of head sweep one as recorded. The first head will produce information from say lines 1 to 40 of field 1; the next head will sweep head sweep 2 of field 2 and produce lines 41 to 80 of field 2; the next head will sweep head sweep 3 of field 3 and produce lines 81 to 120 of field 3 etc.

Thus the memory will contain information for each line of the eventual picture but there will be no complete field, hence the lack of colour and other problems but these are not critical for editing purposes.

Returning to the slow motion mode, it is necessary if this is to be transmitted that the slow motion be synchronised with the existing transmission. This is achieved using the field reference data applied to the video processor 33 and allows the slow motion to be mixed with the transmission so as to be indistinguishable therefrom by delaying the slow motion by up to one line or up to one frame or more.

The use of the apparatus as a synchroniser is not limited to where slow motion is concerned. Any two transmissions can be synchronised and the above apparatus will be quicker than existing apparatus because each broadcast will have its individual lines and fields identified, hence there is no need to wait for a specific point on one broadcast to come around before knowing how much delay should be introduced in order to acceptably match the two transmissions.

I claim:

1. A method of assembling digital data representing a T.V. picture comprising, producing digital words representing a line of video;

producing a digital code indicative of each line of video;

producing a digital code indicative of the field containing the line;

combining said digital codes and said digital words for each line of video;

storing said digital words line by line until a number of lines at least equal in number to the number of lines in a field has been stored; and reading out said digital words.

2. A method according to claim 1, wherein the digital word is split so that the code representing the field is stored separately from said digital words, the digital code representing the line being used as the address for the stored digital words.

3. A method according to claim 1, and including the step of recording the combined digital codes and the digital words on magnetic tape using helical scan apparatus.

4. A method according to claim 3, and including the step of replaying the material on the magnetic tape at a speed different to the recording speed.

5. A method according to claim 4, wherein the step of replaying is conducted at a speed less than the recording speed to produce a slow motion picture.

6. A method according to claim 5, wherein the digital words are written into a memory line by line in a first order and read out of the memory line by line in a second order different to the first.

7. A method according to claim 6, wherein the first order in where the digital words representing a line are witten into the memory at an address representing their position in the eventual picture, and the reading out step is conducted sequentially.

8. A method according to claim 6, wherein the first order is sequential and the second order is the order indicative of the eventual position of the line in the picture.

9. A method according to claim 5, wherein the words read out are fed through a video processor for interpolating information representing one field of video to produce the interlacing field.

10. A method according to claim 4, wherein the step of replaying is conducted at a speed greater than the speed of recording.

11. A digital T.V. system comprising first coding means for producing digital words representing a line of video; second coding means for producing a digital code indicative of each line of video; third coding means for producing a digital code indicative of the field containing the lines of video being encoded by said second coding means; means for combining said digital codes and said digital words for each line of video; second memory means for storing said digital words representing a number of lines at least equal in number to a field of video, and read out means for reading out said digital words.

12. A system according to claim 11 and comprising a separate memory for said digital codes representing the fields of video, and write address means for writing the digital words into the first-mentioned memory, the write address means being responsive to said digital codes representing the lines of video.

13. A system according to claim 11 and comprising helical scan recording means for recording the combined digital words and digital codes on magnetic tape.

14. A system according to claim 13, and comprising play back means for replaying the recorded words and codes at a speed different to the speed of recording.

15. A system according to claim 14, wherein the playback apparatus is arranged to operate at a speed less than the recording speed, and a video processor is provided for interpolating one field of video to produce the interlacing field.

16. A system according to claim 15, wherein said write address generator means is connected to said first memory means for writing the digital words into said first memory means in a first order, and read address generator means for reading the digital words out of said first memory means in a second order different to the first.

* * * * *